March 19, 1963 SEIUEMON INABA ET AL 3,082,363
NUMERICAL POSITION CONTROL SERVOSYSTEM
Filed Dec. 29, 1960 8 Sheets-Sheet 6
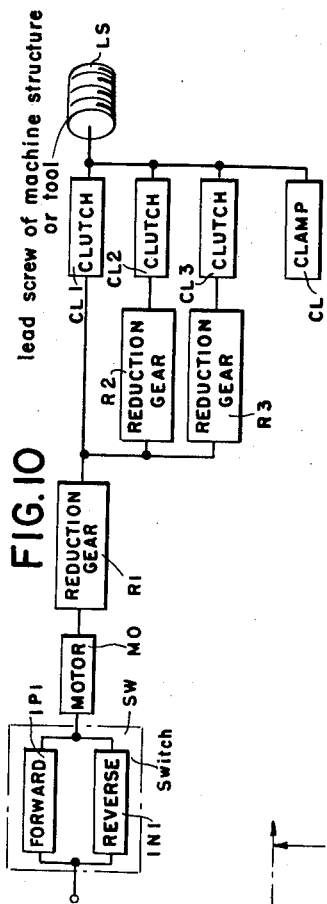
FIG.10
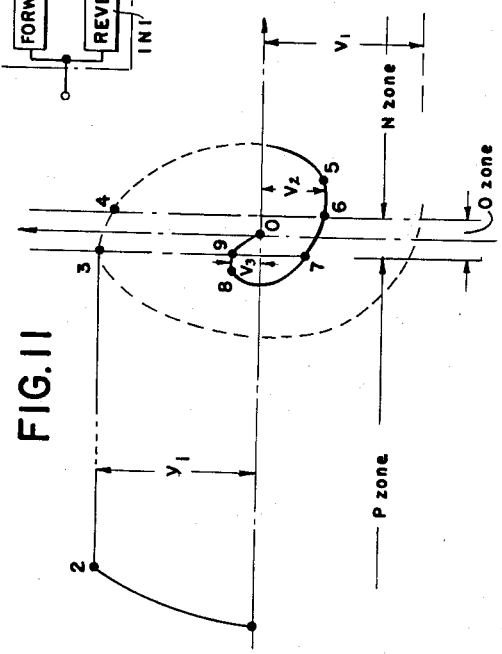
FIG.11
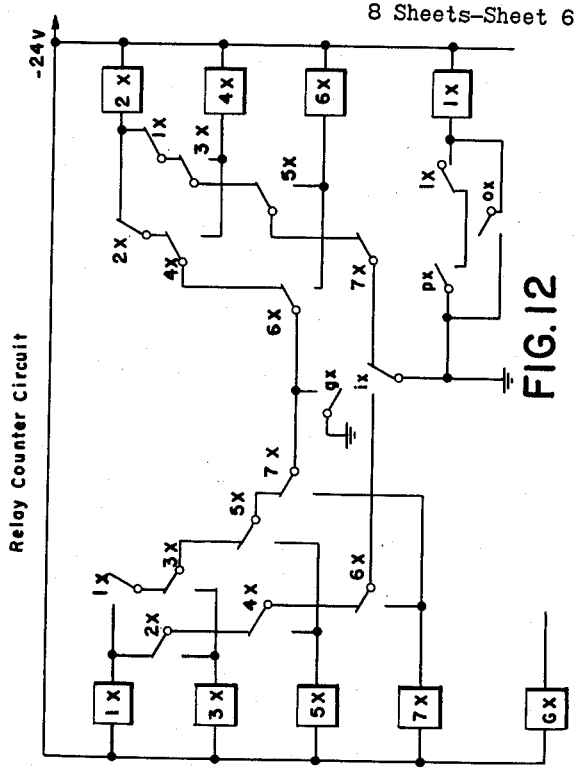
FIG.12
FIG.14
FIG.13

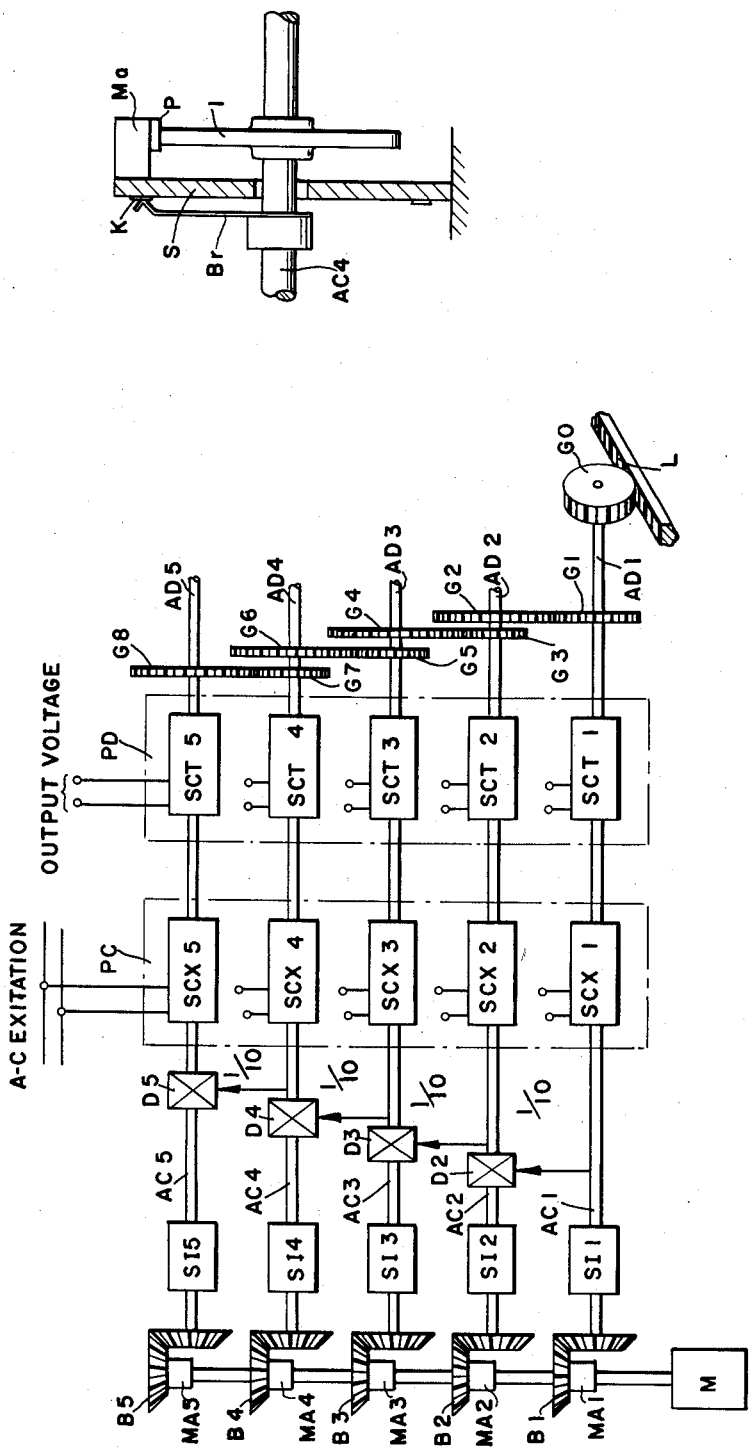

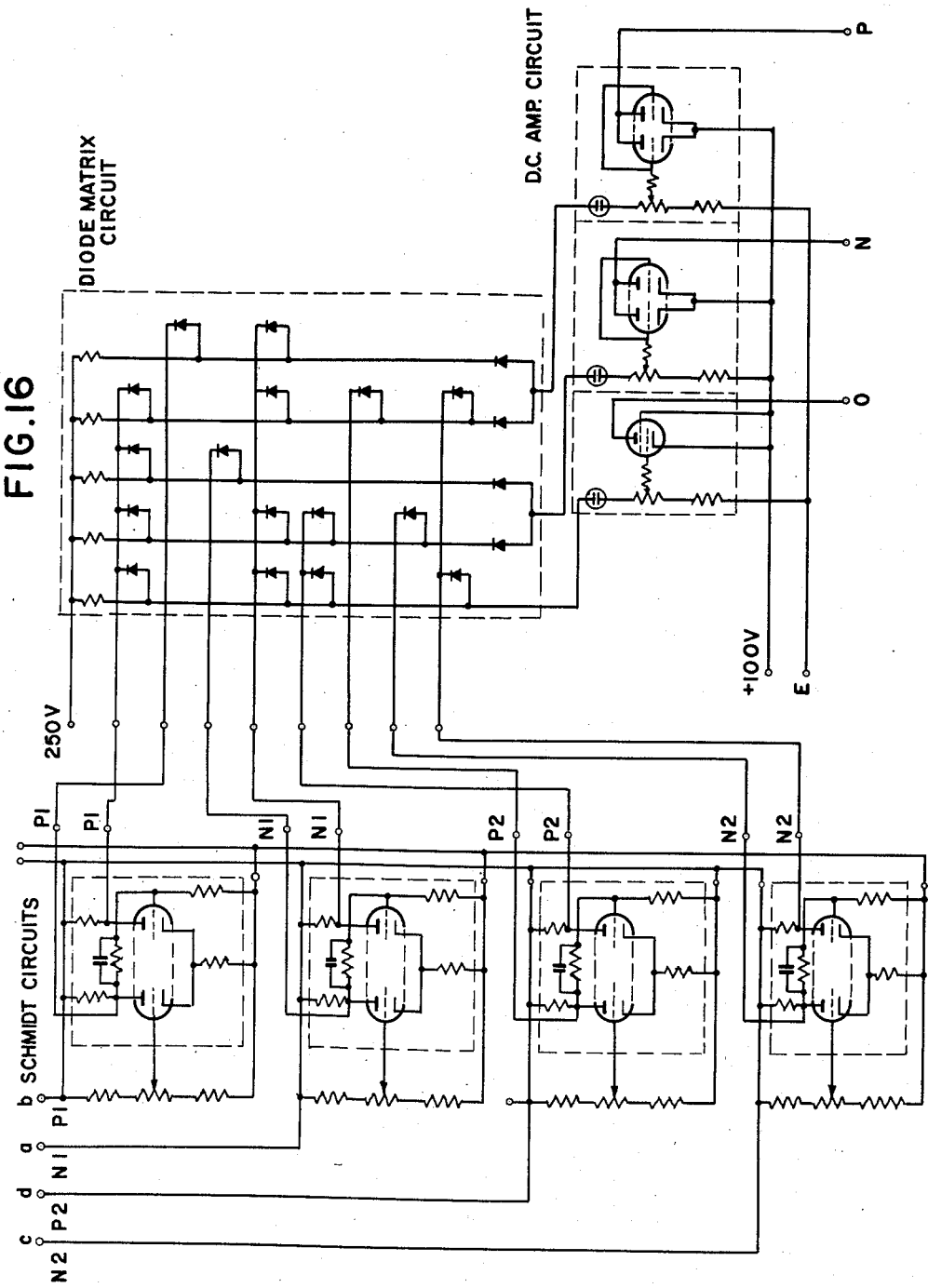

United States Patent Office 3,082,363
Patented Mar. 19, 1963

3,082,363
NUMERICAL POSITION CONTROL SERVOSYSTEM
Seiuemon Inaba, Kanryo Shimizu, and Hajime Mori, Kawasaki-shi, Japan, assignors to Fuji Tsushinki Seizo Kabushiki Kaisha, Kawasaki, Japan, a corporation of Japan
Filed Dec. 29, 1960, Ser. No. 79,430
Claims priority, application Japan Dec. 29, 1959
2 Claims. (Cl. 318—30)

Our invention relates to automatic location or position control systems operating in response to numerical instructions. Such numerical control systems are used for the automatic control of machine tools and other fabricating or processing machinery.

The invention will be described with reference to the accompanying drawings in which:

FIG. 1 is a schematic diagram of a known control system of the general type with which our invention is concerned; FIGS. 1a and 1b show, partly in section, a component portion of the same system.

FIG. 10 illustrates schematically a portion of the control circuit in FIG. 1.

FIG. 11 is a diagram illustrating the movement of the machine structure to be controlled, in response to the control circuit of FIG. 2;

FIGS. 12, 13 and 14 show wiring diagrams of the relay circuits which control the engagement of clutches in the control circuit of FIG. 10; and FIGS. 15 and 16 are circuit diagrams of a control system appertaining to the system shown in FIG. 1.

Figure 1A:
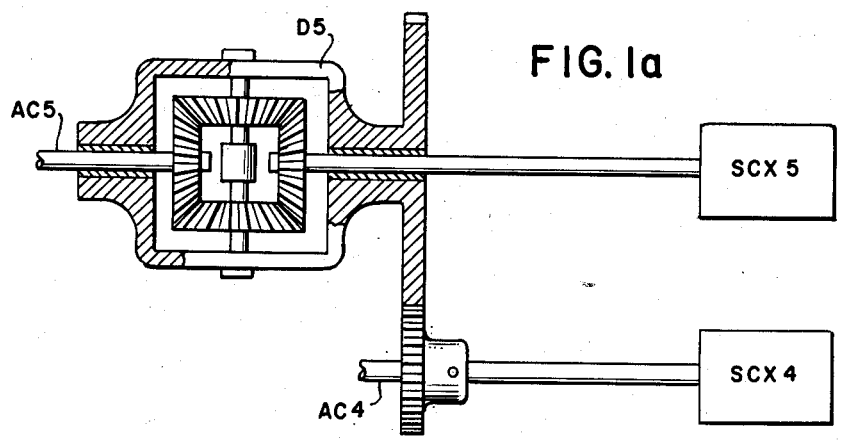
Figure 1C:
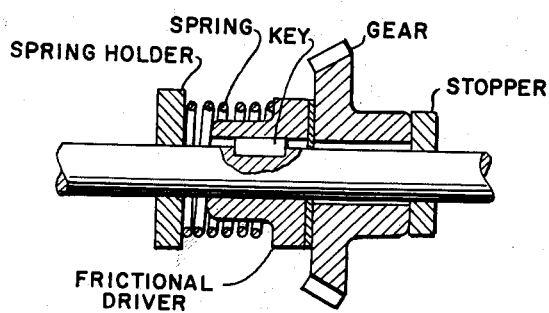
FIG. 1c is an exemplary showing of a slip clutch as used in FIG. 1.

It is the general object of our invention to improve numerical position control systems of the known type exemplified in FIGS. 1 and 1a, wherein a number of synchro transmitters and synchro transformers are employed for issuing a position-responsive control voltage.

The illustrated system comprises a location instructing (data-input) assembly PC, and a position detecting assembly PD. The instructing assembly PC is shown equipped with five synchro control transmitters SCX1 to SCX5 to which numerical instructions are given by a motor M through slip clutches MA1 to MA5, bevel gears B1 to B5, data-input switches SI1 to SI5, data-input shafts AC1 to AC5, and differential gears D1 to D5. Of the above the gear D5 is separately illustrated in FIG. 1a, the data-input switch SI4 is separately illustrated in FIG. 1b, and the slip clutch MA4 is separately illustrated in FIG. 1c. The detecting assembly PD comprises five synchro control transformers SCT1 to SCT5 which are coupled with each other and with a primary detecting shaft AD1 through reduction gears G1 to G8.

Numerical instructions are entered into the system through the data-input switches to the synchro transmitters SCX1 to SCX5, whereas the position of the controlled machine structure is detected by a rack L meshing with pinion G0, and is conveyed to the synchro transformers SCT1 to SCT5. The resultant difference in output voltage produced between the transmitters and the synchro transformers and available at each transformer is used for controlling the position of the machine structure in the sense required to eliminate the difference.

Referring to FIG. 1b, numerical values are imposed upon the shaft as follows. A voltage supply is connected to the one of a plurality of mutually insulated conducting segments K, which corresponds to the desired numerical value; the segments K being mounted peripherally on a stationary selecting plate S of the switch SI4. To utilize this value the above-mentioned motor M rotates the shaft AC4 by way of the slip clutch MA4 and the gear B4. An armature brush Br, keyed upon the shaft AC4 to rotate therewith, contacts the segment K and subsequently energizes a stationary, selecting-plate-mounted electromagnet Ma. An indexing pin, activated by the magnet Ma, positively engages an indexing plate, keyed upon the shaft AC4, stops the motion of the shaft AC4 and locks it in one position. The desired numerical "instruction" value is thus changed into the angular position of the shaft AC4. The switches SI1, SI2, SI3, SI5 similarly imposed other angular positions corresponding to the other desired numerical values upon the shafts AC1, AC2, AC3, AC5.

Each two sequential data-input shafts AC1 to AC5 are coupled with each other by one of the differential gears D1 to D5 at a reduction gear ratio of 1:10, so as to add to the rotary position of the shafts one-tenth of the rotation of the adjacent shaft of next lower order of magnitude. The system is thus rendered particularly suitable for receiving numerical values in decimal digits.

To enter a numerical value of five digits such as $$n = n_5 10^4 + n_4 10^3 + n_3 10^2 + n_2 10 + n_1$$

into the unit PC, the values $n_1$, $n_2$, $n_3$, $n_4$, $n_5$ should be entered into the shafts AC1, AC2, AC3, AC4 and AC5 respectively. These five shafts are simultaneously rotated by the motor M through clutches MA1, MA2, MA3, MA4, MA5 and gears B1, B2, B3, B4, B5. The movement of each shaft is separately restricted by the switches SI1 to SI5 after rotation through angles corresponding to the value of the input digits.

As stated, each two sequential data-input shafts AC1 to AC5 are coupled with each other by one of the differential gears D1 to D5 at a reduction gear ratio of 1:10. The detecting or pilot shafts AD1 to AD5 are analogously coupled with each other by gears G1 to G8 at the same reduction ratio of 1:10. By combining the five synchro transmitters and the corresponding synchro transformers in this manner, a high precision of digital position control is obtainable.

Relative to the positioning drive and appertaining controls to be operated in accordance with the voltage output of the illustrated control system, any control means known for such purposes can be used and the particular means thus employed are not essential to an understanding of the present invention.

Figure 15:
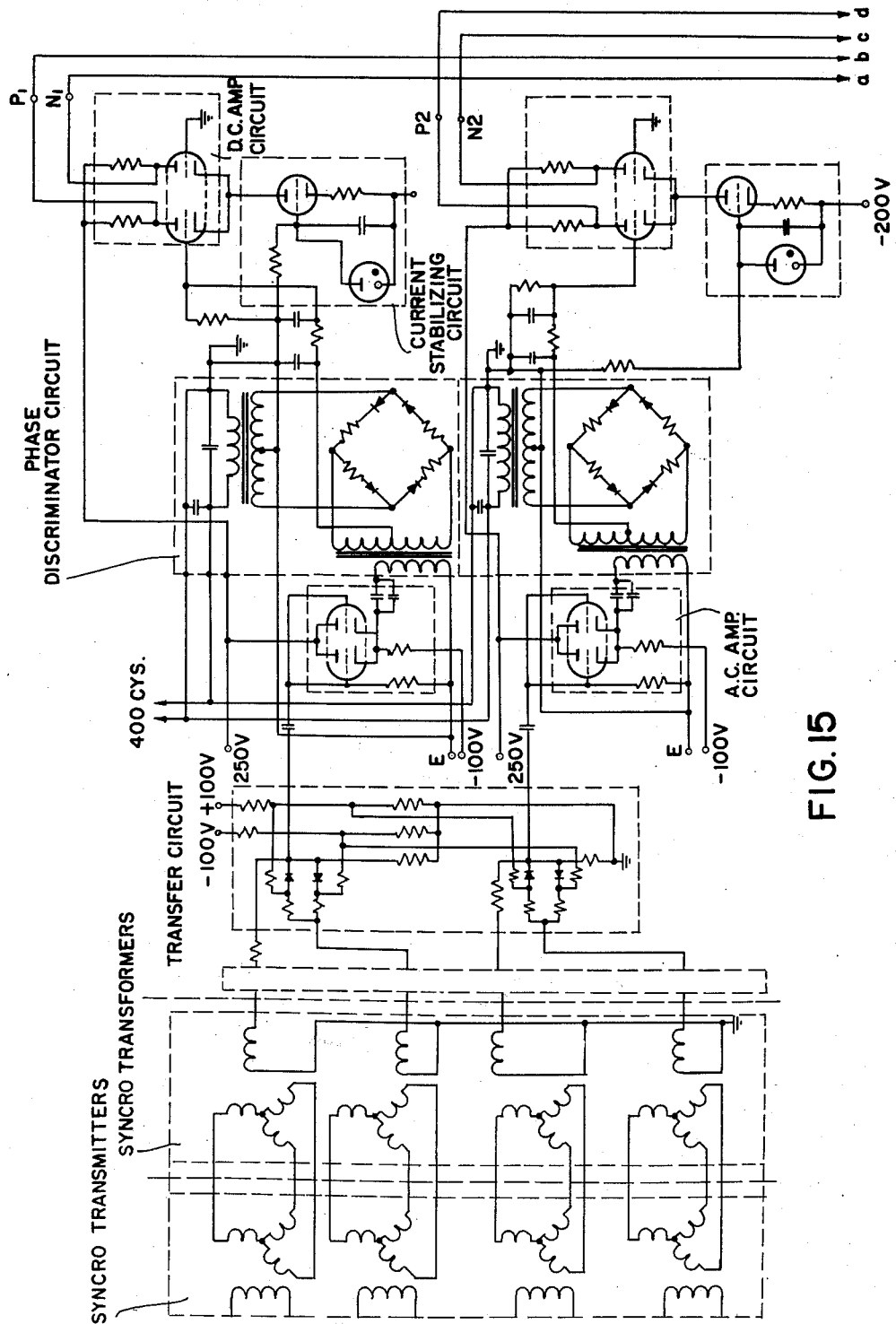

FIGS. 15 and 16 show such a positioning drive and the appertaining controls as connected to a control system identical with the one illustrated in FIG. 1, with the exception of having four synchro transformers instead of the five shown in FIG. 1.

In FIG. 15 the outputs of four synchro transformers are gathered in two outputs in the transfer circuit. The outputs are then converted to direct-current signals in the Phase Discriminator Circuit and further converted to three signals P, N, and O by means of the Voltage Comparison Circuit and the Diode Matrix in FIG. 16. Details of the Phase Discriminator Circuit of FIG. 15 may be found in the "Control Engineers Handbook" compiled by John G. Truxal, first edition, 1958, on p. 6–63, FIG. 6.72, Ring Modulator, and the appertaining explanation.

The three before-mentioned signals are used by the control to locate the machine structure in a known manner.

Reverting to FIGS. 1 and 1a, it will be noted that with the known control system a number of differential gear mechanisms D2 to D5 are indispensable for effecting the desired high precision of control.

Such differential gears are rather complicated in construction, demand intricate adjusting operations, and may involve or develop backlash apt to interfere with high precision, particularly since a number of such differential gear devices are used in mechanical series relation.

It is therefore another object of our invention to also eliminate the need for differential gear mechanisms, thus affording a further simplification and improved reliability of the position control system.

To this end, according to a feature of our invention, the individual data-input shafts of the control system receive driving force or torque from a main shaft or other suitable drive, through corresponding selector switches which supply to the shafts the numerical instructions as well as the position information, which was previously supplied by the differential gears, from the adjacent shafts. The selector switches cooperate with an electric distributor device which comprises a member provided with contact segments and another member provided with contact brushes to cooperate with the segments. One of the two members is fixed to each instructing shaft and the other is journalled for free rotation about the same shaft and is geared to the instructing shaft that corresponds to the next lower numerical order or digit of the numerical instruction to be transmitted. The gear connection is such that the rotatably journalled distribution member is rotated by the lower-order shaft at a fixed reduction ratio. An electrically operated latching device locks the two members of the distributor device together when, during rotation of the instruction shaft, the distributor member fixed thereto has passed through an angle predetermined by the setting of the above-mentioned data-input selector switch. Consequently, the distributor member freely rotatable on the first-mentioned input shaft is rotated an amount equal to the sum of the rotation angle of the first input shaft plus the rotation angle derived from the lower-order instructing shaft.

By providing a control system, operating with such electric selector devices in lieu of the differential gear mechanisms of the known systems, the defects incurred with such differential gears are eliminated, thus affording a further improved precision of control.

The foregoing and other objects, advantages and features of our invention, said features being set forth with particularity in the claims annexed hereto, will be apparent from the following description of the embodiments illustrated by way of example in FIGS. 2 through 13 of the accompanying drawings.

Figure 2:
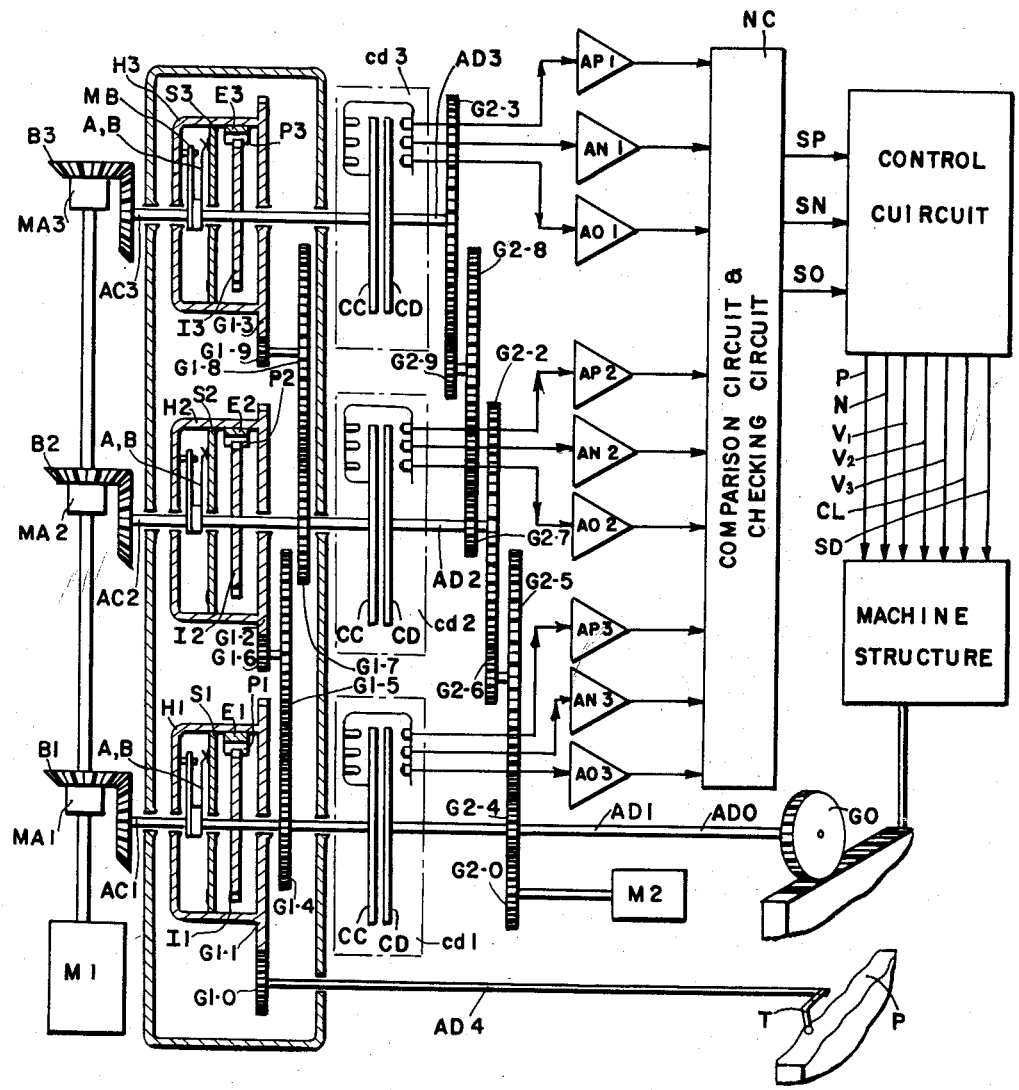
FIG. 2 illustrates schematically an embodiment of a control system according to the invention.

FIG. 2 is a simplified block diagram of the invention which is similar to the system more fully described above with reference to FIG. 1, except that the groups of synchro transformers SCT1 to SCT5 are substituted by a group of photoelectric devices Cd1 to Cd3 and that the differential gears D2 to D5 are substituted by electric selector devices, comprising distributor discs S1 to S3 and indexing plates I1 to I3. While the system of FIG. 2 is shown for three-digit numerical information it should be understood that any desired greater number of digits, for example five digits, may be involved in analogy to FIG. 1.

The electric selector devices effectively accomplish the result previously achieved by the differential gears and by the switches SI1 to SI5. The instructing shafts AC1 to AC3 are each provided with a contact-brush member BM which carries two contact brushes A and B facing the respective distributor discs S1 to S3 on which a number of mutually insulated contact segments, similar to those in switches SI1 to SI5, are mounted as will be described below with reference to FIG. 6. The indexing plates I1 to I3 are fixed on the respective instructing shafts. The distributor discs S1 to S3, as well as indexing pins P1 to P3 and respective control magnets E1 to E3 (FIGS. 2, 8), are all mounted on respective housings H1 to H3 which are journalled on the respective instruction shafts AC1 to AC3 and are firmly joined together with coaxial spur gears G1–1, G1–2 and G1–3 respectively. The rotation of the instructing shafts AC1 and AC2 is conveyed to the housings H2 and H3 at the reduction ratio of 1:100 by means of the gears G1–2 to G1–9. The indexing pins P1 to P3 and the indexing plates I1 to I3 enter into latching engagement with each other and then lock the instructing shafts AC1 to AC3 together with the respective housings H1 to H3 whenever the appertaining electromagnets E1 to E3 are energized.

The shafts AD1 to AD3 serve to detect the position of the controlled machine structure. The shaft AD1, corresponding to the lowest numerical order or digit, is coupled with the shaft AD0 of a pinion G0 meshing with the rank L. Rotation is conveyed to each of the shafts AD1 and AD2 at a reduction ratio of 1:100 through gears G2–2 to G2–9.

In the embodiment of the invention shown in FIG. 2 to groups of synchro transmitters SCX1 to SCX5 and synchro transformers SCT1 to SCT5 of FIG. 1 are substituted by a group of photoelectric devices Cd1 to Cd3 which perform the same function. These photoelectric devices form the subject of the invention in the application Serial No. 79,429, filed on the date of this application as a companion to this application and assigned to the assignee of this application.

Each of the three photoelectric devices Cd1 to Cd3 is provided with two coaxial discs CC and CD (FIGS. 2 to 5). Location instructions are given to the discs CC by means of the instructing shaft AC1 to AC3 to be further explained relative to FIGS. 6–10. The position of the machine structure to be controlled is detected by a rack L and a pinion G0, acting through a detecting shaft AD and reduction gears G1 and G2 on the respective discs CD of the photoelectric devices Cd1 to Cd3. The three photoelectric devices produce an electric output voltage of negative or positive polarity depending upon the amount and direction of departure of the disc Cd from the position of the instruction disc CC, this voltage being reduced to zero when the positions of the respective discs coincide with each other. The electric output voltage serves for high-precision control of the machine structure to be controlled.

Figure 3:
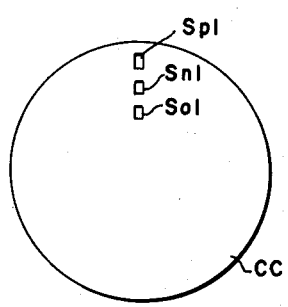
FIGS. 3, 4 and 5 are a front view, side view and rear view respectively of one of several photoelectric devices which form part of the system shown in FIG. 2.
Figure 4:
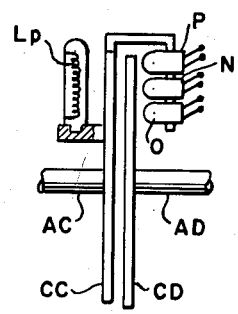
Figure 5:
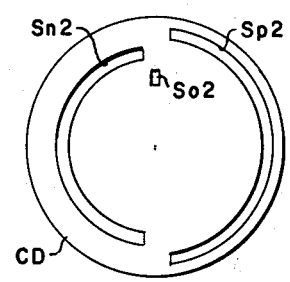

The above-mentioned photoelectric devices are separately illustrated in FIGS. 3, 4 and 5. Each photoelectric device comprises a photoelectric sensing unit composed of a lamp $Lp$ mounted on disc CC, and three photoelectric elements P, N and O, preferably consisting of phototransistors. The location instructing disc CC has three holes $Sp1$, $Sn1$ and $So1$ which face the photo electric elements P, N and O respectively. The position detecting disc CD has two arcuate slits $Sp2$, $Sn2$ and a hole $So2$. The slits $Sp2$ and $Sn2$ are so arranged that they do not overlap each other.

Depending upon the relative angular position of the discs CC and CD, one of the three photo electric elements P, N and O produces an output voltage of the proper polarity. When the discs CC and CD are so positioned relative to each other that the two holes $So1$ and $So2$ register with each other, the output voltage of the photoelectric element O is zero. However, when the discs are so positioned that the hole $Sp1$ is located on the slit $Sp2$, the element P produces a positive output voltage. Analogously, when the hole $Sn1$ is located opposite the slit $Sn2$, the element N produces a negative output voltage. The zero output of the element O is indicative of the fact that the angular deviation between the discs CD and CC is zero.

For the purpose of a position controlling operation, the location instructing disc CC is to be pre-set to a desired angular position, and the position of the detecting disc CD is so controlled that it stops in a position corresponding to that of the machine structure being controlled. In this manner, it is possible to precisely control the location of the machine structure by means of the output voltages from the photoelectric elements P, N and O. The output voltage of the element O may then serve for definitely stopping the displacing motion of the position-controlled machine structure.

Figure 6:
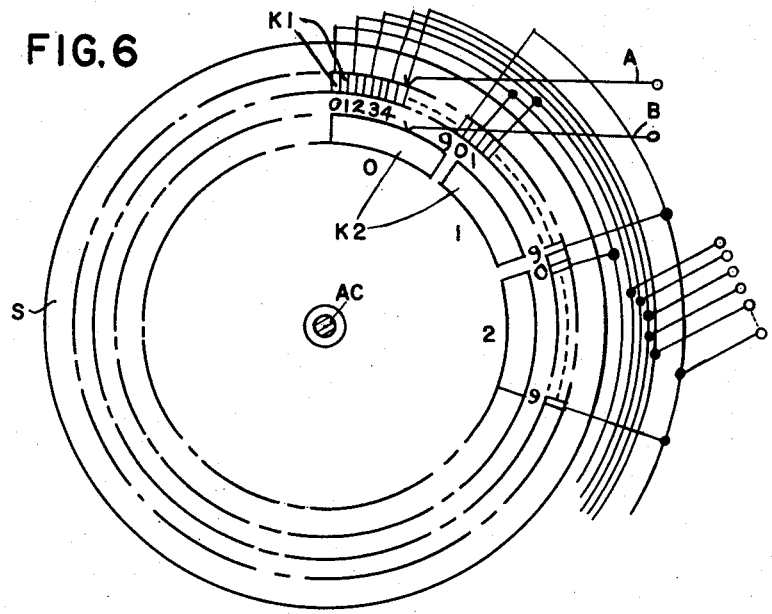
FIG. 6 shows a distributor used in the system of FIG. 2.

FIG. 6 shows an example of one of the distributor discs S1, S2, S3. The disc has one-hundred contact segments K1 corresponding to the first (lowest) numerical order or digit, and ten segments K2 corresponding to the second numerical order. The two circles of segments K1 and K2 are engageable by respective contact brushes A and B which slide along the segment of each circle when the distributor disc S rotates relative to the brush-holding member of the device. When disc S is being rotated while voltages are being impressed, for example on the segment "4" in circle K1 and on segment "3" in circle K2, the brushes A and B pick up a signal as soon as they come into engagement with these two segments. The signal thus picked up indicates the numerical value "34."

Figure 8:
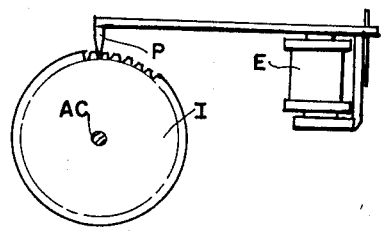
FIG. 8 shows an indexing plate forming a component of the same system.

The design of one of the indexing plates I is shown in FIG. 8. The plate is essentially a gear equipped with one-hundred peripherally distributed teeth which are engageable by the latch pin P under control by one of the magnets E. When the magnet E is energized, the pin P enters into a tooth recess of the indexing plate and thus checks the revolution of the instructing shaft AC relative to the housing to which the magnet E is attached, whereas if the magnet E is not excited, the shaft AC can revolve freely with respect to the housing and the magnet.

Figure 7:
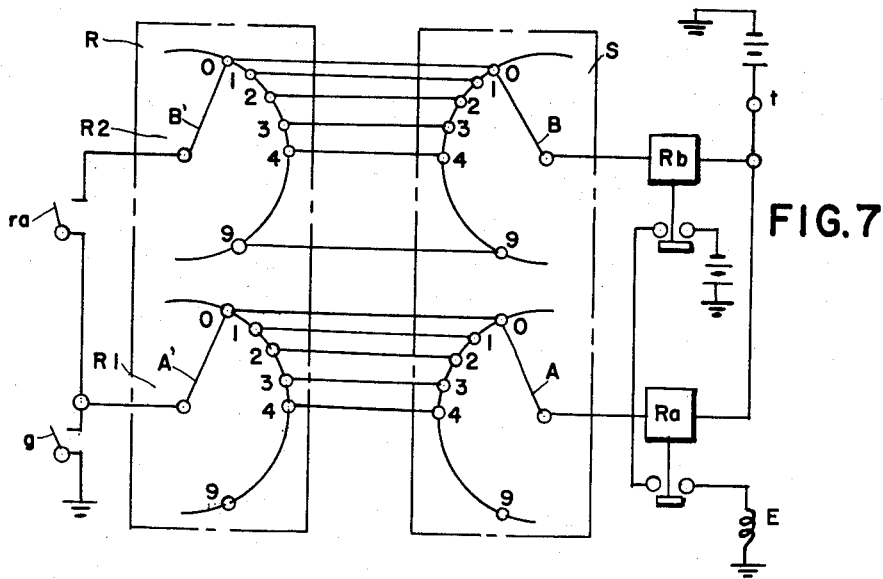
FIG. 7 is a wiring diagram of the distributor.

The operation of each E-magnet is controlled by the distributor disc S through the circuit connections shown in FIG. 7. According to FIG. 7, the control system is provided with a numerical instruction (data-setting) device R composed of two rotary selector switches R1 and R2. In the illustrated embodiment, each of these selector switches has a bank of ten contacts denoted by "0" to "9" respectively. The contact arms A' and B' of the respective selector switches can be set into engagement with one of the bank contacts in accordance with the two-digit instruction to be entered into the system. Also illustrated in FIG. 7 is one of the distributor discs S with contact brushes A and B. A relay Ra responds when the brush A arrives at an instructed position. A second relay Rb responds when the brush B arrives at the instructed position. For example, when the respective arms A' and B' of the rotary selectors R1 and R2 are set at the contacts "3" and "4," and the instructing shaft AC is being turned, the relays Ra and Rb are both energized when the brushes A and B touch the contact segments "3" and "4" respectively. The two relays Ra and Rb then energize the magnet E which moves the latch pin P into engagement with the indexing plate I, thus locking the instructing shaft AC into rigid connection with the housing H1, H2 or H3.

Figure 9:
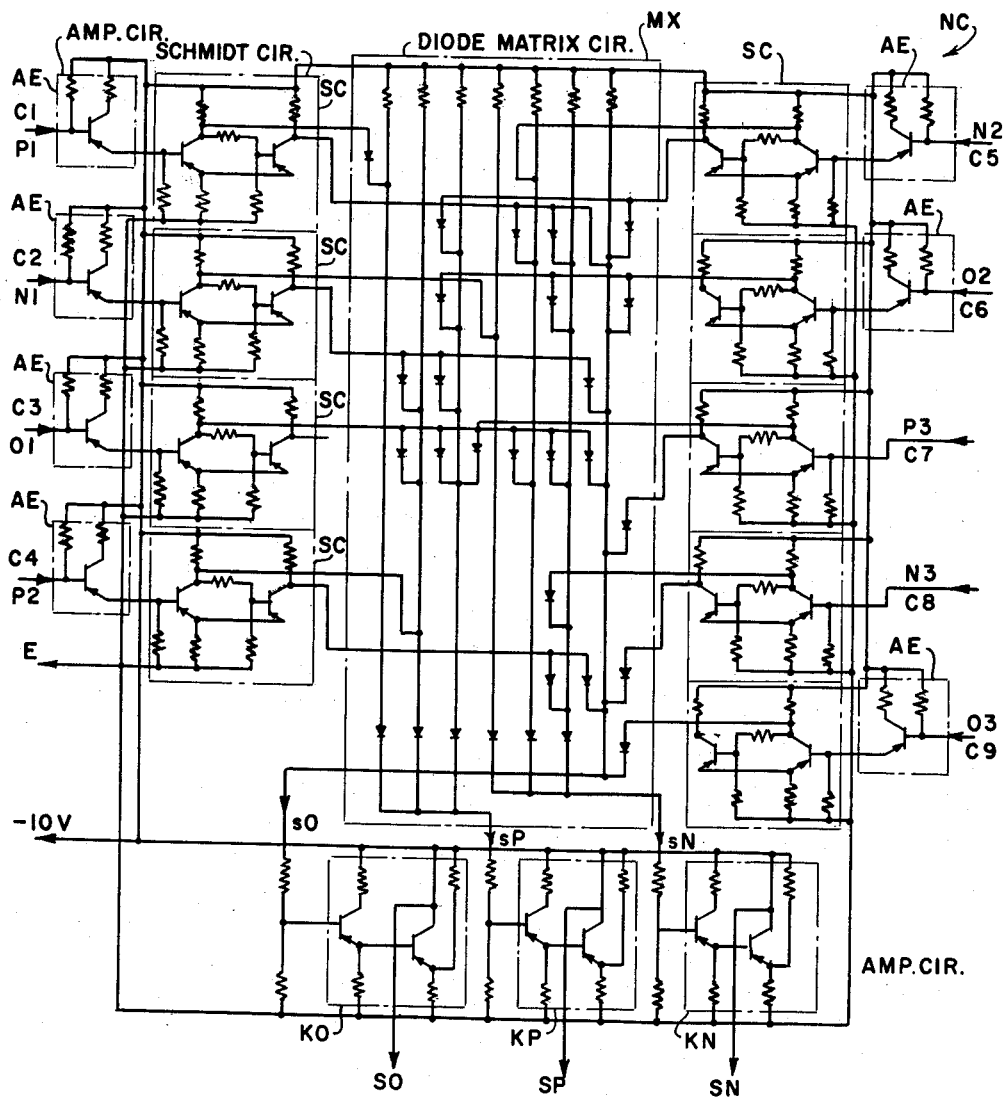
FIG. 9 is a schematic diagram of the Comparison Circuit and Checking Circuit of FIG. 2.

The electric output voltage from the photoelectric elements precisely controls the machine structure to be controlled by means including separate amplifiers AO1, AP1, AN1; AO2, AP2, AN2; and AO3, AP3, AN3 which respectively connect the elements P, N and O of photoelectric devices Cd1, Cd2, Cd3 to a network NC composed of a comparison circuit and a checking circuit. FIG. 9 schematically illustrates the network NC. Because the latter is not essential to the invention and known networks may be substituted therefor it is described only generally as is necessary for a clear understanding of the invention. Additional explanation may be obtained therefor in the "Control Engineers Handbook," compiled by John G. Truxal, first edition, p. 6-75, FIG. 6.91 and the text pertaining thereto. Seven emitter-follower connected amplifiers AE transmit all but two of the input signals of the network NC to seven corresponding so-called "Schmidt circuit" triggers designated SC; the other two input signals, from amplifiers AP3 and AN3, being connected directly to corresponding Schmidt circuit triggers. A diode matrix circuit MX including a combination of "and" circuits and "or" circuits then converts the nine signals to three signals sP, sN, sO, which are in turn electrically enhanced by three amplifiers KP, KN and KO to form three output signals designated SP, SN, SO.

A control circuit designated CS utilizes the signals SP, SN and SO to direct the motion of the machine structure to be controlled carrying the rack L; the latter serving to detect, in conjunction with the pinion G0, the position of the machine tool.

FIG. 10 generally illustrates, by way of a block diagram, the construction and operation of the control circuit. A switch Sw, having forward and reverse motor-switching members 1P1 and 1N1 operating in dependence upon the signal applied thereto, energizes a motor MO for forward or reverse movement, or stops the motor. A reduction gear R1 couples the shaft of motor MO to the lead screw LS, or the like, of the machine structure to be controlled by way of a disengageable clutch CL1, by way of reduction gear R2 and disengageable clutch CL2, or by way of a very-high-ratio reduction gear R3 and clutch CL3. A sequential switching system (FIGS. 12–15) determines which clutch (CL1, CL2 or CL3) is engaged at any time, and operates so that when a positive position signal is first applied to the motor MO as a result of the machine tool being offset in one direction from the desired input signal, the clutch CL1 is engaged and the rotational velocity applied to the lead screw LS has the greatest value. When the machine tool, as a result of this high initial velocity, inertially overshoots its zero position, a zero signal first occurs and the clutch CL1 is disengaged. The overshoot then applies a negative signal to the motor and reversal of motor direction occurs. The switching system, in response to this zero signal and reversal, serves to engage clutch CL2 so that the reverse rotational velocity applied to lead screw LS has an intermediate magnitude. Another reversal results in disengagement of clutch CL2 and engagement of clutch CL3 for a still slower rotation of the lead screw LS. The reduction of speed by gear R3 is sufficient to prevent the machine tool from passing over the desired position and a clamp CL serves to stop the lead screw SL. The sequential switching system is illustrated in FIG. 11 although it is not essential to this invention.

FIG. 11 illustrates the movement of the machine structure to be controlled when the circuit of FIG. 8 moves that structure from the position 1 to the position 0. The structure is first detected, by a P signal resulting from the position of rack L, at position 1 in the P zone of FIG. 9. The switch 1P1 is thus closed by the P signal so that the motor MO is driven, by way of the clutch CL1, in the forward direction to move the lead screw LS at speed $V_1$. When the structure to be controlled is driven by the motor MO and arrives at position 3, the P signal is eliminated and an O signal is detected to open switch number 1P1 and disengage clutch CL1. When the inertia of the structure carries it past the desired position 0 to position 4, the switch 1N1 is closed so that the motor MO is driven in the reverse direction, the latter rotating the lead screw LS, by way of clutch CL2, in the reverse direction at a speed $V_2$ somewhat slower than $V_1$. Similarly movement of the structure to position 7 effects turning of the lead screw LS in the forward direction, by way of clutch CL3, at a still lower speed $V_3$. Movement of the structure to be controlled to position 9 stops the motor MO and clamp CL serves to stop the rotation of the lead screw LS.

The above-described operation is particularly relevant for the case when the structure to be controlled is in the P zone. When the structure is in the N zone the speed $V_1$ is not changed as a result of the first O signal. Only the driving direction is then reversed as a result of the first O signal. Further movement of the structure occurs as described above.

Thus location of the structure is accomplished with great precision as the lead screw LS allows the structure to make repeated passes at the desired position at stepwise decreasing speeds.

FIG. 12 is an example of the Relay Counter Circuit which selectively engages and disengages the clutches CL1, CL2, CL3 and the clamp CL. A Signal Receiving Circuit and a Control Relay Circuit associated with the Relay Counter Circuit are shown in FIGS. 11 and 12 respectively. FIGS. 12, 13 and 14 are interconnected in that a plurality of relay coils having a prefix letter or number and an upper-case suffix letter; namely coils IX, GX and 0X to 7X; magnetically control the corresponding switch members in any of these figures having the same corresponding lower-case prefix letter or number and the corresponding lower-case suffix letter; namely switch members $ix$, $gx$, and $0x$ to $7x$ respectively.

The relay GX in FIG. 12 begins to operate after the confirmation of the end of the settling of the digital instruction in order to prepare the operation of the circuit in FIGS. 12, 13 and 14. The relay IX operates upon each O signal so as to operate the Counter Circuit.

Driving motion is imparted to the instructing shafts AC1 to AC3 from a motor M1 through respective slip clutches MA1, MA2, MA3 and respective bevel gears B1, B2, B3. The motor M2, a torque motor, takes up any backlash in the gearing G0 and L. This is accomplished by the continuous transmission of torque in a fixed direction.

While FIG. 7 shows an instruction-entering device for two digits, it will be understood that a third selector switch and a third circle of contact segments can be used for a three-digit system and that any desired number of further digits can be added analogously.

The system operates as follows:

First, numerical digital instructions are entered by correspondingly setting the selector switches R and thus applying voltage to the proper contact segments of the distributor discs S1 to S3. Then the members BM, each carrying two brushes A and B, are rotated together with the respective instruction shafts. When the brushes and hence the instruction shafts reach the proper positions corresponding to the respective digits of the numerical instruction entered into the system, the magnets E1 to E3 are energized. The pins B1 to B3 then catch into the respective indexing plates I1 to I3 so that the instructing shafts AC1 to AC3 become locked together with the respective housings H1 to H3. When this occurs, the friction clutches MA1 to MA3 permit continued rotation of the drive motor M1 while the instruction shafts AC1 to AC3 remain at standstill. In the meantime, the rotation of the shafts AC1 and AC2 was conveyed to the housings H2 and H3 as well as to the distributor discs S2 and S3 respectively, at the reduction ratio of 1:100. Accordingly, each disc S2 and S3 revolves an angle corresponding to the given numerical instructions plus 1/100 of the respective rotating angle of the shafts AC1 and AC2. As a result, the instructing discs CC of the photoelectric devices are rotated in accordance with the entered numerical instruction, and the subsequent rotation of the discs DC has the effect of supplying the desired position control to the machine structure to be set in accordance with the numerical instructions, as explained above.

A lever T on an auxiliary detecting shaft AD4 shown in FIG. 2 may be coupled with gear G1–1 through a gear G1–0 for the purpose of correcting pitch errors of the rack L with the aid of a cam plate P.

It will be understood by those skilled in the art, upon a study of this disclosure, that our invention permits of various modifications with respect to structural components and circuitry, and may be given embodiments other than particularly illustrated and described herein, without departing from the essential features of our invention and within the scope of the claims annexed hereto.

We claim:

1. A numerical control system for controlling the position of structure, comprising a main shaft, a number of control shafts coupled with said main shaft to be angularly entrained thereby in accordance with respective digital values of the main-shaft angular displacement; a selector device assembled with each one of said respective control shafts and comprising a selector member with electric selector contact segments, and a brush member with contact brushes selectively engageable with said segment, one of said two members being fixed on said control shaft and the other member being rotatable about said control shaft, an indexing plate fixed on said control shaft, an electromagnet fixedly joined with said other member and having latch means engageable with said indexing plate for latching it relative to said other member when said magnet is energized, a gear rotatably journalled on said control shaft and joined with said magnet and said other member, a reduction transmission of fixed ratio including said gear and connecting said other member and magnet with the one other control shaft corresponding to the next lower digital order of the numerical instruction supplied by rotation of said main shaft; a number of electric selector switch means connected with said contact segments of said respective selector devices for entering respective positional instructions, electric circuit means connecting said magnet with said brush member of each selector device whereby said magnet is energized to latch said control shaft when the angular position of said control shaft is in accordance with said instructions; a position detecting member movable in accordance with positional change of the structure to be controlled, a number of pilot shafts digitally intercoupled and operatively connected with said detecting member to be angularly displaced in accordance with respective digital values of the detector-member displacement, each of said pilot shafts forming a pair together with the one digitally corresponding control shaft; and a number of sensing devices each being operatively connected with the two shafts of each shaft pair for response to angular discrepancy therebetween, whereby said sensing means issue a corrective output signal when the instantaneous angular position of one shaft departs from that of the other.

2. In a control system according to claim 1, each of said sensing devices comprising photoelectric sensing means and two discs coaxially mounted on said respective shafts of each pair, said two discs having aperture means in coactive relation to said sensing means whereby said sensing means issue a corrective output signal when the instantaneous angular position of one disc departs from that of the other.

References Cited in the file of this patent

UNITED STATES PATENTS 2,848,670    Kelling et al. _____ Aug. 19, 1958